United States Patent
Fukada et al.

(10) Patent No.: US 8,159,395 B2
(45) Date of Patent: Apr. 17, 2012

(54) COMMUNICATION DEVICE, COMMUNICATION SYSTEM, POSITION DETECTION METHOD AND PROGRAM

(75) Inventors: Hiroyuki Fukada, Tokyo (JP); Seiichi Izumi, Kanagawa (JP)

(73) Assignee: Sony Corporation, Tokyo (JP)

( * ) Notice: Subject to any disclaimer, the term of this patent is extended or adjusted under 35 U.S.C. 154(b) by 188 days.

(21) Appl. No.: 12/646,194

(22) Filed: Dec. 23, 2009

(65) Prior Publication Data

US 2010/0171663 A1 Jul. 8, 2010

(30) Foreign Application Priority Data

Jan. 8, 2009 (JP) ................ P2009-002783

(51) Int. Cl.
*G01S 1/30* (2006.01)
(52) U.S. Cl. ................................ 342/394
(58) Field of Classification Search .......... 342/394
See application file for complete search history.

(56) References Cited

U.S. PATENT DOCUMENTS

| | | | | |
|---|---|---|---|---|
| 3,825,928 A | * | 7/1974 | Williams | 342/158 |
| 4,873,531 A | * | 10/1989 | Heddebaut et al. | 343/711 |
| 6,824,480 B2 | | 11/2004 | John et al. | |
| 2010/0008268 A1 | * | 1/2010 | Whinnett et al. | 370/295 |

FOREIGN PATENT DOCUMENTS

| | | |
|---|---|---|
| JP | 08-262121 | 10/1996 |
| JP | 2001-185935 | 7/2001 |
| JP | 2001-237755 | 8/2001 |
| JP | 2005-003579 | 1/2005 |
| JP | 2006-329671 | 12/2006 |

* cited by examiner

*Primary Examiner* — Harry Liu
(74) *Attorney, Agent, or Firm* — Finnegan, Henderson, Farabow, Garrett & Dunner, L.L.P.

(57) ABSTRACT

There is provided a communication device including: a receiving unit that receives radio signals transmitted from another communication device using a plurality of transmitting antennas by a plurality of receiving antennas; an estimation unit that estimates a range of a position where said another communication device possibly exists based on a phase of each radio signal received by the receiving unit and antenna spacing between the transmitting antennas; and a position determination unit that determines an existing position of said another communication device within the range estimated by the estimation unit.

9 Claims, 11 Drawing Sheets

COMMUNICATION DEVICE, COMMUNICATION SYSTEM, POSITION DETECTION METHOD AND PROGRAM

BACKGROUND OF THE INVENTION

1. Field of the Invention

The present invention relates to a communication device, a communication system, a position detection method and a program.

2. Description of the Related Art

Various techniques have been proposed that detect a position of a device of its own or a device at the other end of communication with use of radio signals transmitted or received by radio communication. Among them, a technique that detects a position by using an array antenna is based on the prerequisite that signals arrive at a receiving array as spherical waves. It is thus necessary to lengthen a baseline of the receiving array according to an assumed distance to a signal source. However, if the antenna spacing of the receiving array is a half-wavelength or larger, a grating lobe occurs, which hampers determining a position uniquely.

In order to satisfy such conflicting conditions, U.S. Pat. No. 6,824,480, for example, discloses a technique that prepares a plurality of pairs of receiving antennas arranged with the spacing of a half-wavelength or smaller and widens the spacing between the respective pairs, thereby enhancing the accuracy of position detection.

SUMMARY OF THE INVENTION

However, according to the technique disclosed in U.S. Pat. No. 6,824,480, it is necessary to mount a large number of antennas elements in a receiving device, which causes an increase in circuit scale and costs.

In light of the foregoing, it is desirable to provide a novel and improved communication device, communication system, position detection method and program capable of accurately measuring a position of a device at the other end of communication with use of a small number of antennas.

According to an embodiment of the present invention, there is provided a communication device including: a receiving unit that receives radio signals transmitted from another communication device using a plurality of transmitting antennas by a plurality of receiving antennas; an estimation unit that estimates a range of a position where said another communication device possibly exists based on a phase of each radio signal received by the receiving unit and antenna spacing between the transmitting antennas; and a position determination unit that determines an existing position of said another communication device within the range estimated by the estimation unit.

Antenna spacing between the receiving antennas in the receiving unit may be larger than a half of a wavelength of a radio signal.

The position determination unit determines the existing position according to eigenvalue analysis by using a steering vector corresponding to coordinates of each position within the range estimated by the estimation unit.

The estimation unit may include: an angle calculation unit that calculates, for each receiving antenna, a path angle between a baseline of the transmitting antennas and a communication path to the receiving antenna based on phase differences among radio signals received from the transmitting antennas by the receiving antenna; and a range estimation unit that estimates a range of a position where said another communication device possibly exists based on differences in the path angle calculated by the angle calculation unit among the receiving antennas.

The receiving unit may include at least three receiving antennas, and then the estimation unit may estimate a range of a position where said another communication device possibly exists based on coordinates of an intersection of a first circular locus specified according to a difference in the path angle between a first pair of receiving antennas and a second circular locus specified according to a difference in the path angle between a second pair of receiving antennas.

The estimation unit may acquire the antenna spacing between the transmitting antennas from said another communication device through the receiving unit.

According to another embodiment of the present invention, there is provided a communication system containing: a transmitting device including a transmitting unit that transmits radio signals from a plurality of transmitting antennas; and a receiving device including: a receiving unit that receives radio signals transmitted from the transmitting device by a plurality of receiving antennas, an estimation unit that estimates a range of a position where the transmitting device possibly exists based on a phase of each radio signal received by the receiving unit and antenna spacing between the transmitting antennas, and a position determination unit that determines an existing position of the transmitting device within the range estimated by the estimation unit.

The antenna spacing between the transmitting antennas in the transmitting unit may be equal to or smaller than a half of a wavelength of a radio signal, and antenna spacing between the receiving antennas in the receiving unit may be larger than a half of a wavelength of a radio signal.

According to another embodiment of the present invention, there is provided a position detection method including the steps of: receiving radio signals transmitted from another communication device using a plurality of transmitting antennas by a plurality of receiving antennas; estimating a range of a position where said another communication device possibly exists based on a phase of each received radio signal and antenna spacing between the transmitting antennas; and determining an existing position of said another communication device within the estimated range.

According to another embodiment of the present invention, there is provided a program causing a computer controlling a communication device including a receiving unit that receives radio signals transmitted from another communication device using a plurality of transmitting antennas by a plurality of receiving antennas to implement functions including: an estimation unit that estimates a range of a position where said another communication device possibly exists based on a phase of each radio signal received by the receiving unit and antenna spacing between the transmitting antennas; and a position determination unit that determines an existing position of said another communication device within the range estimated by the estimation unit.

According to the embodiments of the present invention described above, it is possible to provide a communication device, a communication system, a position detection method and a program capable of accurately measuring a position of a device at the other end of communication with use of a small number of antennas.

DETAILED DESCRIPTION OF THE EMBODIMENT(S)

Figure 1:
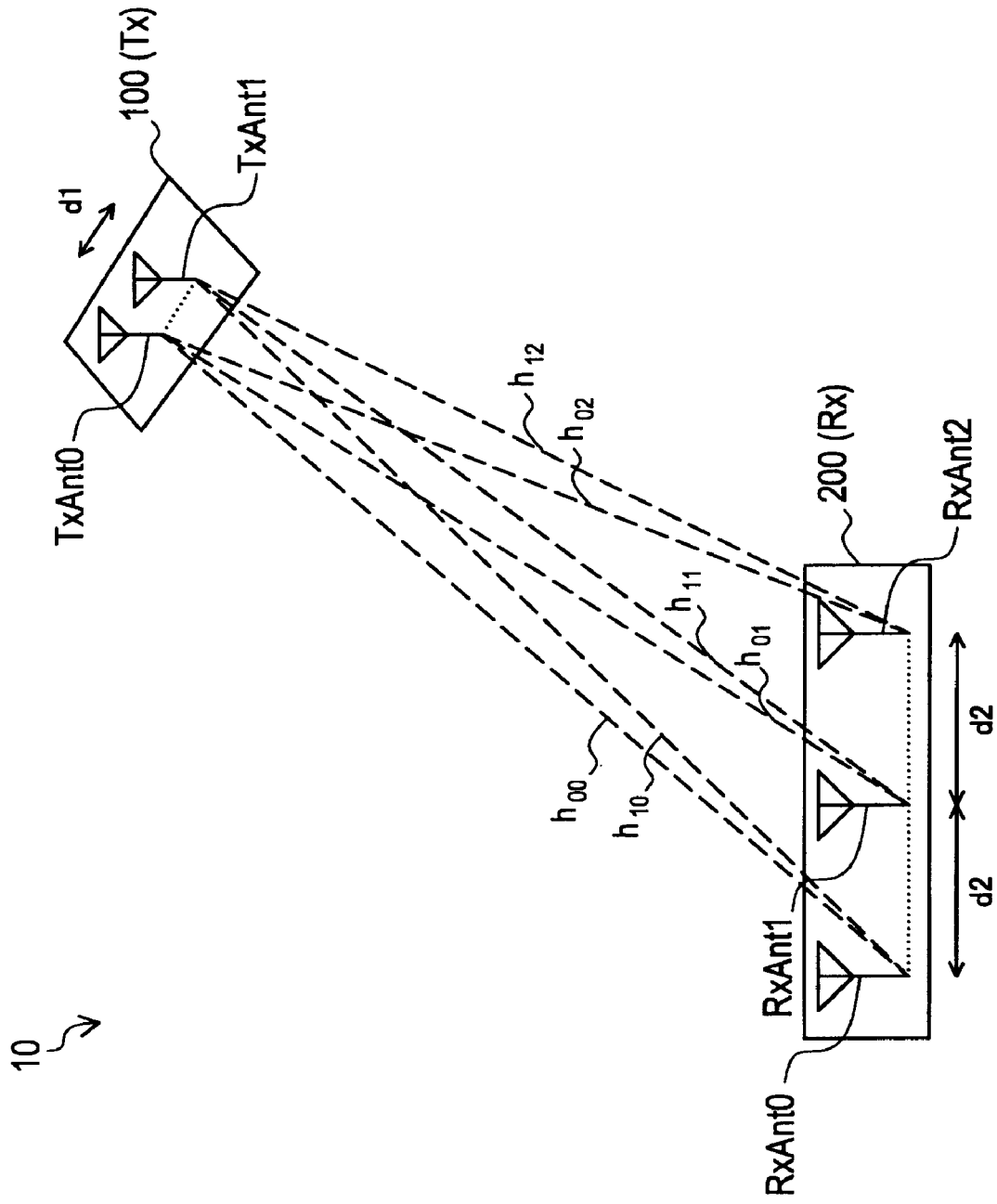
FIG. 1 is a view schematically showing a communication system according to an embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

A preferred embodiment of the present invention will be described hereinafter in the following order.

1. Overview of Communication System according to Embodiment
2. Explanation of Configuration of Device
2-1. Configuration of Transmitting Device
2-2. Configuration of Receiving Device
3. Range Estimation Processing (First Stage)
4. Position Determination Processing (Second Stage)
5. Flow of Processing
6. Summary <1. Overview of Communication System according to Embodiment>

An overview of a communication system 10 according to an embodiment of the present invention is described firstly.

FIG. 1 is a view schematically showing the communication system 10 according to an embodiment of the present invention. Referring to FIG. 1, the communication system 10 includes a transmitting device (Tx) 100 and a receiving device (Rx) 200.

The transmitting device 100 includes at least two transmitting antennas respectively capable of transmitting radio signals. In the example of FIG. 1, the transmitting device 100 includes two transmitting antennas TxAnt0 and TxAnt1. When a wavelength of a radio signal transmitted from the transmitting device 100 to the receiving device 200 is $\lambda$, antenna spacing d1 between the two transmitting antennas TxAnt0 and TxAnt1 of the transmitting device 100 satisfies $d1 \leq \lambda/2$. For example, the transmitting antenna spacing may be $d1=\lambda/2$.

Meanwhile, the receiving device 200 includes at least three receiving antennas respectively capable of receiving radio signals transmitted from the transmitting antennas of the transmitting device 100. In the example of FIG. 1, the receiving device 200 includes three receiving antennas RxAnt0, RxAnt1 and RxAnt2. When a wavelength of a radio signal received by the receiving device 200 is $\lambda$, antenna spacing d2 between the adjacent receiving antennas of the receiving device 200 satisfies $d2 \geq \lambda/2$. For example, the receiving antenna spacing may be $d2=10\lambda$.

Between the transmitting device 100 and the receiving device 200, six communication channels (MIMO channels) $h_{00}$, $h_{10}$, $h_{01}$, $h_{11}$, $h_{02}$ and $h_{12}$ are formed as shown in FIG. 1. The numerical subscript of the reference symbol of the communication channel corresponds to the numerals of the transmitting antenna and the receiving antenna. For example, the communication channel $h_{00}$ is a communication channel between the transmitting antenna TxAnt0 and the receiving antenna RxAnt0. For another example, the communication channel $h_{10}$ is a communication channel between the transmitting antenna TxAnt1 and the receiving antenna RxAnt0 (the same applies to the other antennas).

It should be noted that a distance between the transmitting device 100 and the receiving device 200 is sufficiently longer than the transmitting antenna spacing d1. Namely, communication paths from the transmitting antennas TxAnt0 and TxAnt1 of the transmitting device 100 to any one receiving antenna of the receiving device 200 can be approximated to be parallel to one another.

Figure 2:
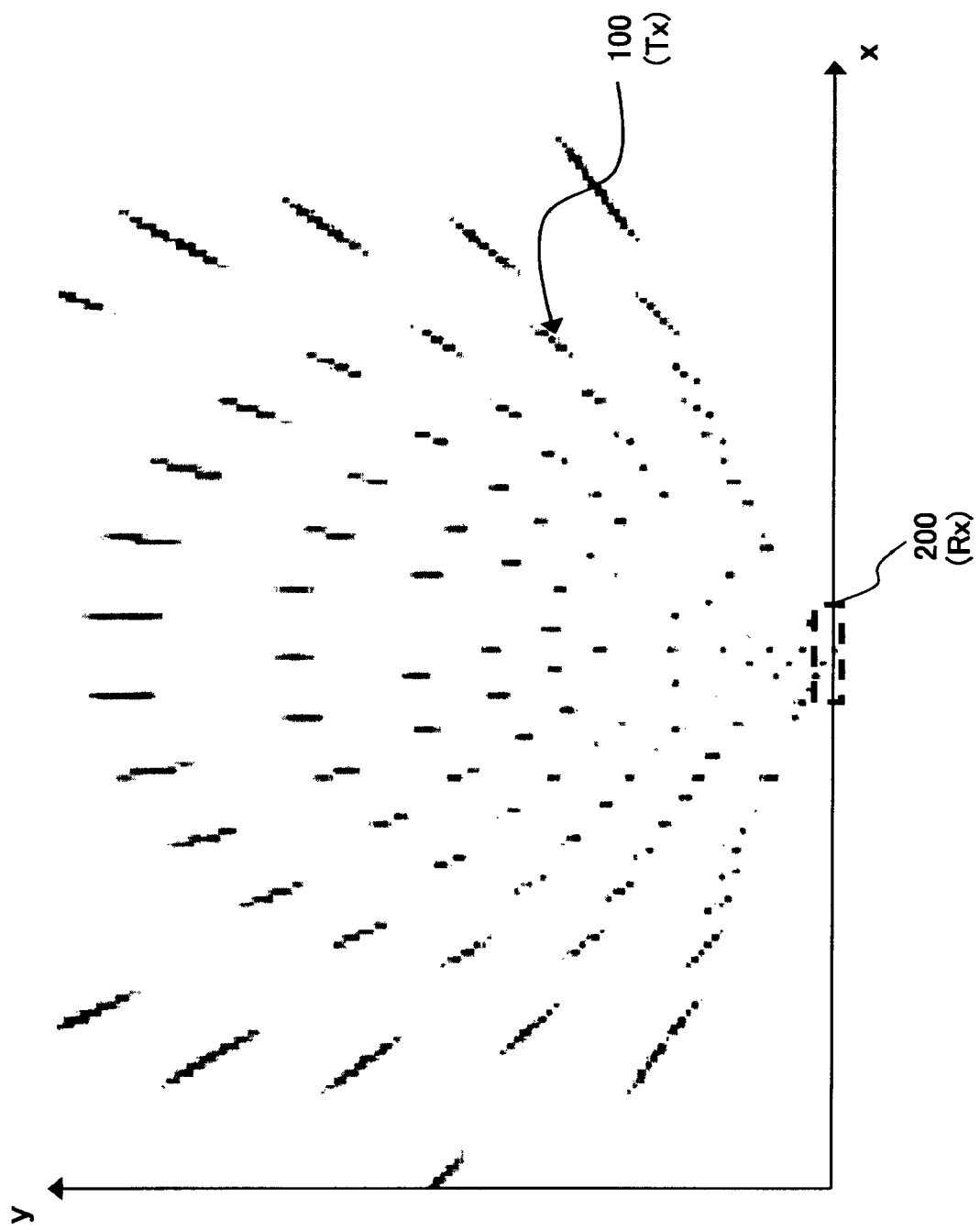
FIG. 2 is an explanatory view showing an example of a MUSIC spectrum calculated according to a general MUSIC method.

In the context of the above-described configuration of the communication system 10, FIG. 2 shows a result of analysis that a position of the transmitting device 100 is analyzed in the receiving device 200 according to a multiple signal classification (MUSIC) method, which is general eigenvalue analysis.

FIG. 2 is an explanatory view showing the plot of a result of evaluating the possibility that the transmitting device 100 exists according to the MUSIC method (i.e. MUSIC spectrum) with respect to each position in a certain plane in the vicinity of the receiving device 200. In FIG. 2, the direction of a baseline of the receiving antennas RxAnt0 to RxAnt2 of the receiving device 200 is on the x-axis, and the direction perpendicular to a baseline of the receiving antennas RxAnt0 to RxAnt2 is on the y-axis. As the contrast plotted in each coordinates on the x-y plane is darker, the possibility that the position of the coordinates is an existing position of the transmitting device 100 is higher.

As is understood from FIG. 2, virtual images that look as if the transmitting device 100 existed appear in positions different from the actual position of the transmitting device 100 on the x-y plane in the vicinity of the receiving device 200. Such virtual images appear generally when the receiving antenna spacing d2 of the receiving device 200 is larger than a half-wavelength of a radio signal, and the number of virtual images increases as the antenna spacing becomes larger. Such virtual images appear due to the effect of a so-called grating lobe incase of estimating an arrival direction by using the MUSIC method.

Thus, in order to detect a position of the transmitting device 100 at high accuracy without increasing the number of receiving antennas in the receiving device 200, it is necessary to eliminate the effect of virtual images shown in FIG. 2 and identify the exact position. In view of this, in the communication system 10 according to the embodiment, the effect of virtual images is eliminated by narrowing down the range where there is a possibility that the transmitting device 100 exists in a first stage and then determining a position of the transmitting device 100 in a second stage, as described in detail from the following section.

It should be noted that the case where the receiving device 200 shown in FIG. 1 detects a position of the transmitting device 100 is described in this specification by way of illustration. However, a device at the receiving end of communication does not necessarily detect a position of a device at the transmitting end. The present invention is thus equally applicable to the case where any communication device detects a position of a device at the other end of communication.

<2. Explanation of Configuration of Device>

Configurations of the transmitting device 100 and the receiving device 200 included in the communication system 10 shown in FIG. 1 are described hereinafter with reference to FIG. 3 and FIG. 4, respectively.

[2-1. Configuration of Transmitting Device]

Figure 3:
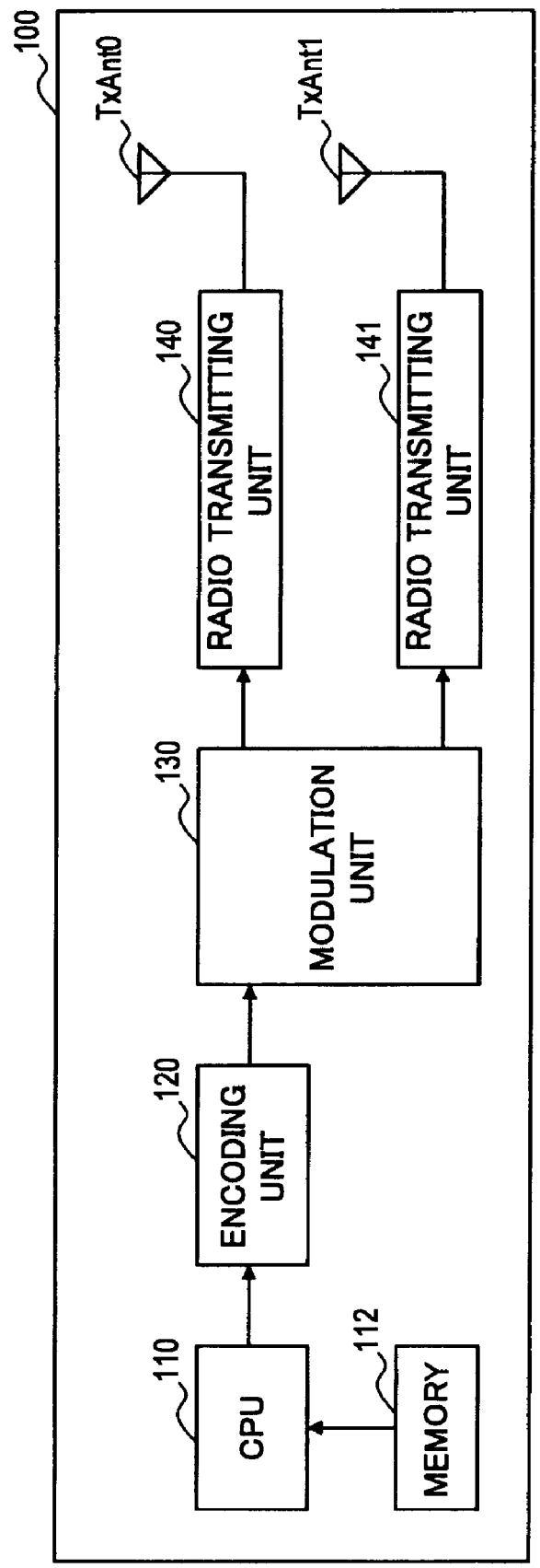
FIG. 3 is a block diagram showing an example of a configuration of a transmitting device according to an embodiment.

FIG. 3 is a block diagram showing an example of a configuration of the transmitting device 100 according to the embodiment. Referring to FIG. 3, the transmitting device 100 includes a central processing unit (CPU) 110, memory 112, an encoding unit 120, a modulation unit 130, radio transmitting units 140 and 141 and transmitting antennas TxAnt0 and TxAnt1.

The CPU 110 executes a program stored in the memory 112, for example, and controls the overall operation of each component of the transmitting device 100. For example, the CPU 110 acquires data of the antenna spacing between the transmitting antennas TxAnt0 and TxAnt1 which is previously stored in the memory 112 and writes the acquired data to a communication packet to be transmitted to the receiving device 200. The receiving device 200 performs range estimation processing in the first stage, which is described later, by using the data of the transmitting antenna spacing. The memory 112 stores a program, control data or the like to be used for communication between the transmitting device 100 and the receiving device 200 by using semiconductor memory such as read only memory (ROM), for example.

The encoding unit 120 encodes transmission data output from the CPU 110 according to a desired encoding scheme to thereby generate a communication packet and outputs the communication packet to the modulation unit 130. At this point, the encoding unit 120 may perform interleaving or the like in addition to encoding of transmission data. The modulation unit 130 modulates the communication packet input from the encoding unit 120 according to a desired modulation scheme and outputs the modulated communication packet to the radio transmitting units 140 and 141. The radio transmitting unit 140 transmits the modulated communication packet input from the modulation unit 130 as a radio signal through the transmitting antenna TxAnt0. Likewise, the radio transmitting unit 141 transmits the modulated communication packet input from the modulation unit 130 as a radio signal through the transmitting antenna TxAnt1. The radio signals transmitted in this manner are received by the receiving device 200, which is described next, via the six communication channels $h_{00}$ to $h_{12}$ shown in FIG. 1.

[2-2. Configuration of Receiving Device]

Figure 4:
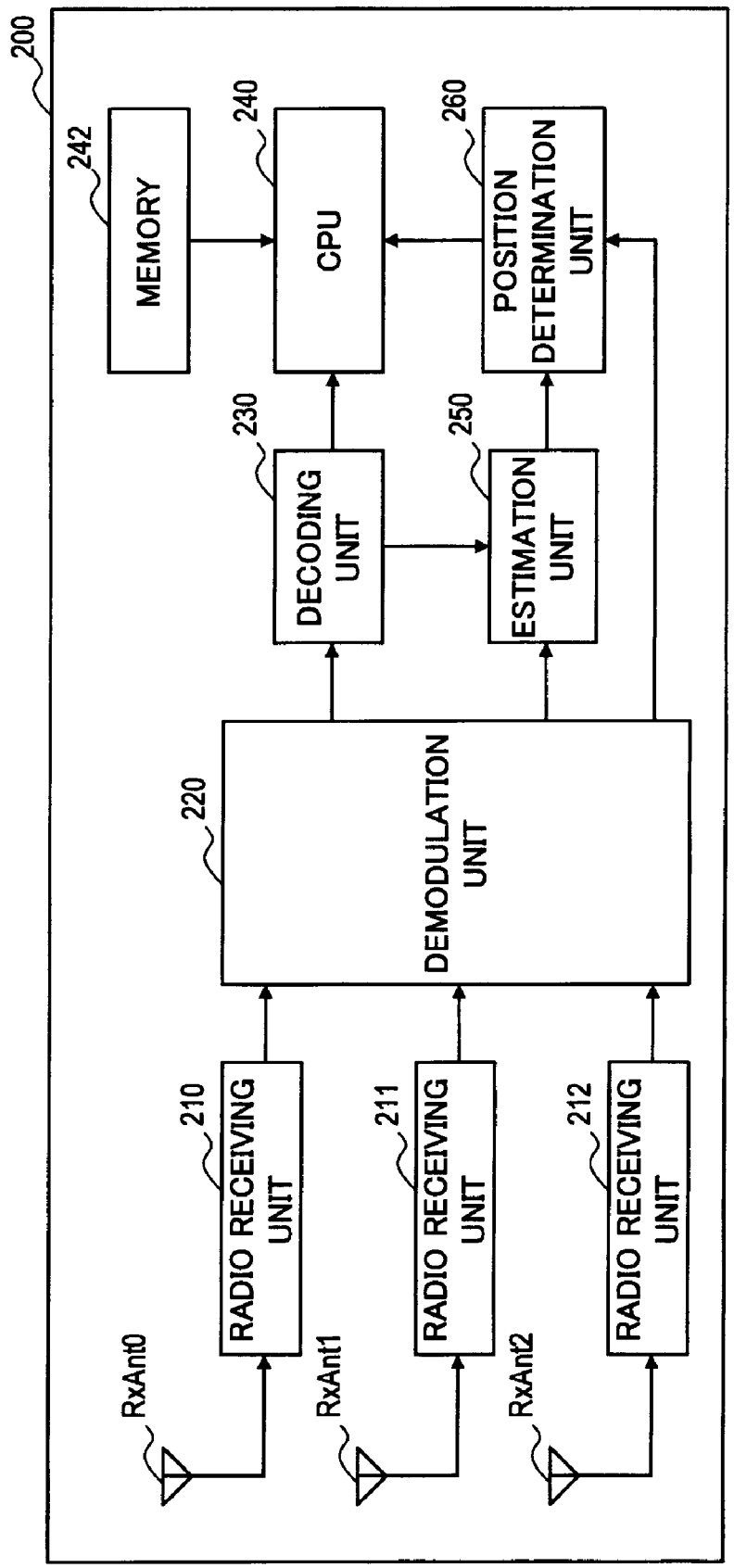
FIG. 4 is a block diagram showing an example of a configuration of a receiving device according to an embodiment.

FIG. 4 is a block diagram showing an example of a configuration of the receiving device 200 according to the embodiment. Referring to FIG. 4, the receiving device 200 includes receiving antennas RxAnt0 to RxAnt2, radio receiving units 210 to 212, a demodulation unit 220, a decoding unit 230, a CPU 240, memory 242, an estimation unit 250 and a position determination unit 260.

The radio receiving units 210 to 212 receive the radio signals transmitted from the transmitting antennas TxAnt0 and TxAnt1 of the transmitting device 100 by using the corresponding receiving antennas RxAnt0 to RxAnt2, respectively. The radio receiving units 210 to 212 then perform amplification and analog-to-digital (AD) conversion of the received radio signals and output the signals to the demodulation unit 220.

The demodulation unit 220 demodulates the received signals respectively input from the radio receiving units 210 to 212 according to a given modulation scheme and outputs the demodulated received signals to the decoding unit 230. Further, the demodulation unit 220 estimates channel responses $h_{00}$ to $h_{12}$ of the respective communication channels from the received signals and uses them for demodulation of the received signals. The demodulation unit 220 outputs the estimated channel responses $h_{00}$ to $h_{12}$ to the estimation unit 250 and the position determination unit 260.

The decoding unit 230 decodes the demodulated received signals input from the demodulation unit 220 according to a given encoding scheme and outputs the decoded signals to the CPU 240. Further, the decoding unit 230 acquires the data of the transmitting antenna spacing of the transmitting device 100 written to the received communication packet and outputs the data to the estimation unit 250. The CPU 240 executes a program stored in the memory 242, for example, and controls the overall operation of each component of the receiving device 200. The memory 242 stores a program, control data or the like to be used for communication between the transmitting device 100 and the receiving device 200 by using semiconductor memory such as ROM, for example.

The estimation unit 250 performs estimation of an existing range where there is a possibility that the transmitting device 100 exists as processing of the first stage for position detection described above. Specifically, the estimation unit 250 estimates the above-described existing range based on the phases of the received signals demodulated by the demodulation unit 220 and the spacing between the transmitting antennas input from the decoding unit 230. The range estimation processing by the estimation unit 250 is described in detail later.

The position determination unit 260 evaluates the possibility that the transmitting device 100 exists with respect to each position within the existing range estimated by the estimation unit 250 as processing of the second stage for above-mentioned position detection. The position determination unit 260 then determines the position of the transmitting device 100 based on the evaluation result. The position determination processing by the position determination unit 260 is described in detail later.

The configurations of the transmitting device 100 and the receiving device 200 according to the embodiment are described above with reference to FIGS. 3 and 4. Hereinafter, the range estimation processing by the estimation unit 250 and the position determination processing by the position determination unit 260 in the receiving device 200 are described in further detail with reference to FIGS. 5 to 10.

[3. Range Estimation Processing (First Stage)]

Figure 5:
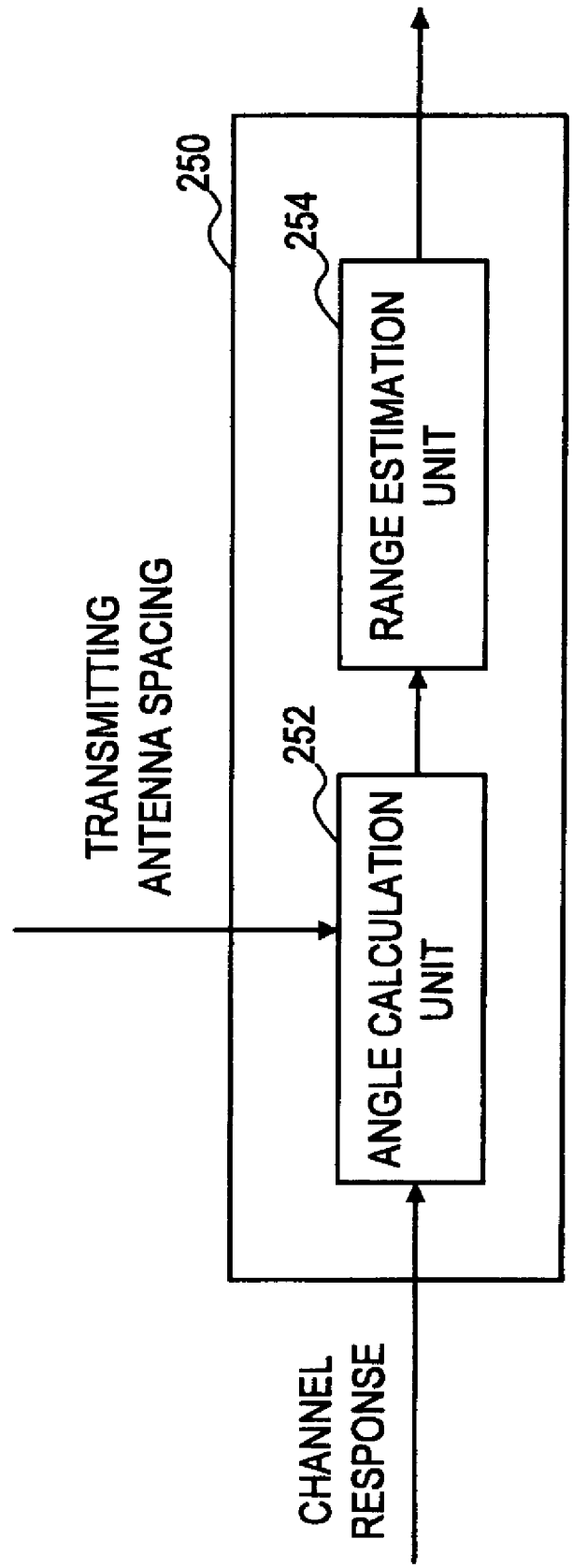
FIG. 5 is a block diagram showing an example of a detailed configuration of an estimation unit according to an embodiment.

FIG. 5 is a block diagram showing an example of a detailed configuration of the estimation unit 250. Referring to FIG. 5, the estimation unit 250 includes an angle calculation unit 252 and a range estimation unit 254.

[3-1. Calculation of Path Angle]

The angle calculation unit 252 calculates, for each receiving antenna, a path angle between a baseline of transmitting antennas and a communication path from the transmitting antennas to the receiving antenna based on phase differences for each of the transmitting antennas among radio signals received by the receiving antenna.

Figure 6:
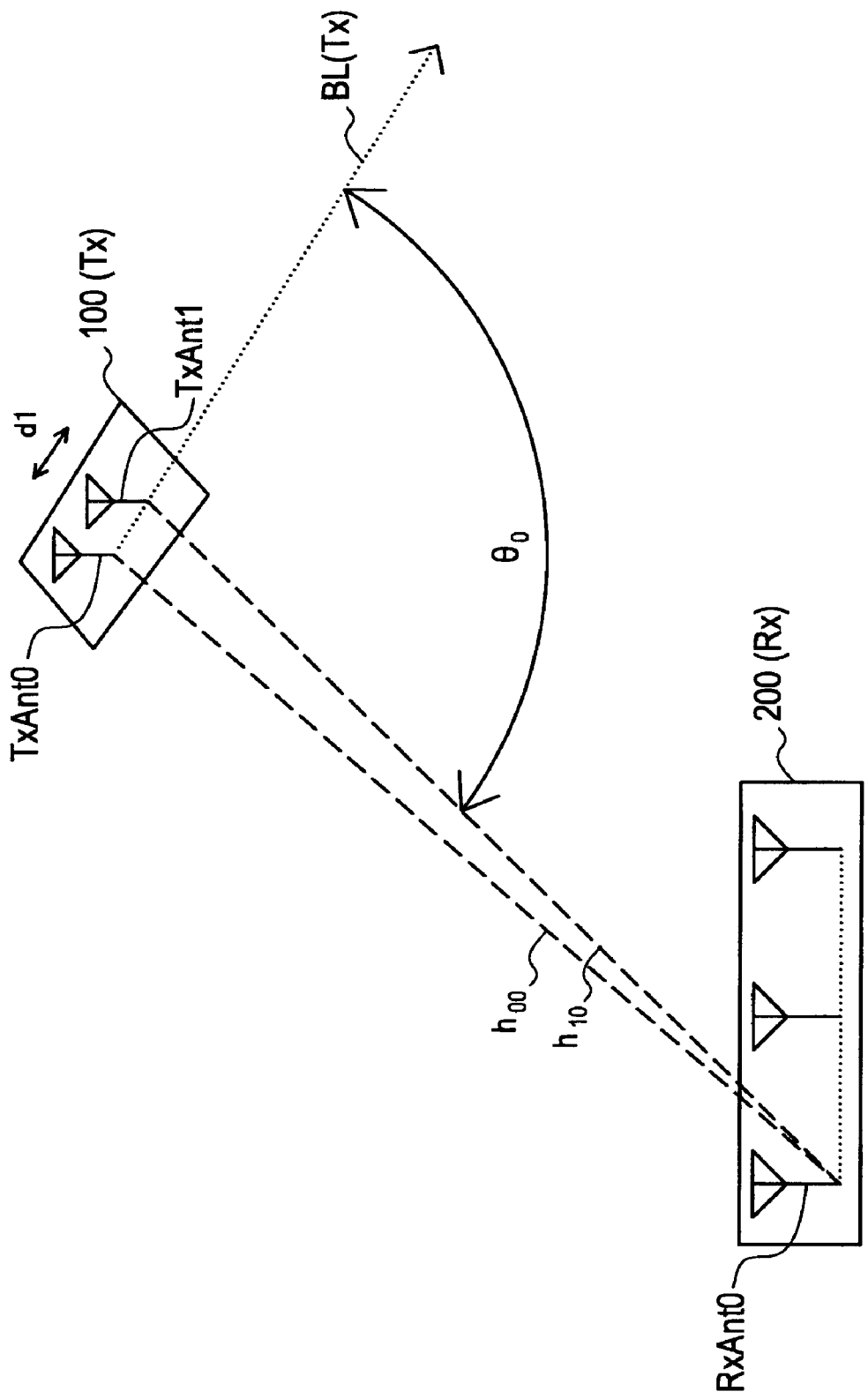
FIG. 6 is an explanatory view to describe path angle calculation processing by an angle calculation unit.

FIG. 6 is an explanatory view to describe path angle calculation processing by the angle calculation unit 252.

Referring to FIG. 6, a path angle $\theta_0$ of the receiving antenna RxAnt0 with respect to a baseline BL(Tx) of the transmitting antennas is shown. The path angle $\theta_0$ is calculated by the angle calculation unit 252 in the following manner, for example.

First, the angle calculation unit 252 calculates a phase difference between two radio signals received by the receiving antenna RxAnt0 (which are radio signals transmitted from the transmitting antennas TxAnt0 and TxAnt1) based on the channel responses $h_{00}$ and $h_{10}$ of the respective communication channels. The phase difference calculated at this point is referred to as a phase difference $\phi_0$. Next, the angle calculation unit 252 calculates a difference $\Delta L_0$ between a path length from the transmitting antenna TxAnt0 to the receiving antenna RxAnt0 and a path length from the transmitting antenna TxAnt1 to the receiving antenna RxAnt0 by using the phase difference $\phi_0$. Because the transmitting antenna spacing d1 is equal to or smaller than a half-wavelength $\lambda/2$ of a radio signal, the path length difference $\Delta L_0$ is derived from the following expression.

$$\Delta L_0 = \frac{\phi_0}{2\pi} \cdot \lambda \qquad \text{Expression 1}$$

Then, the angle calculation unit 252 calculates a hyperbolic locus formed by the receiving antenna RxAnt0 with respect to the baseline BL(Tx) of the transmitting antennas by using the transmitting antenna spacing d1 input from the decoding unit 230 and the path length difference $\Delta L_0$. The angle calculation unit 252 then sets an angle between a straight line approximated by the hyperbolic locus and the baseline BL(Tx) as a path angle for the receiving antenna RxAnt0 on the assumption that a distance between the transmitting device 100 and the receiving device 200 is sufficiently longer than the transmitting antenna spacing d1.

Figure 7:
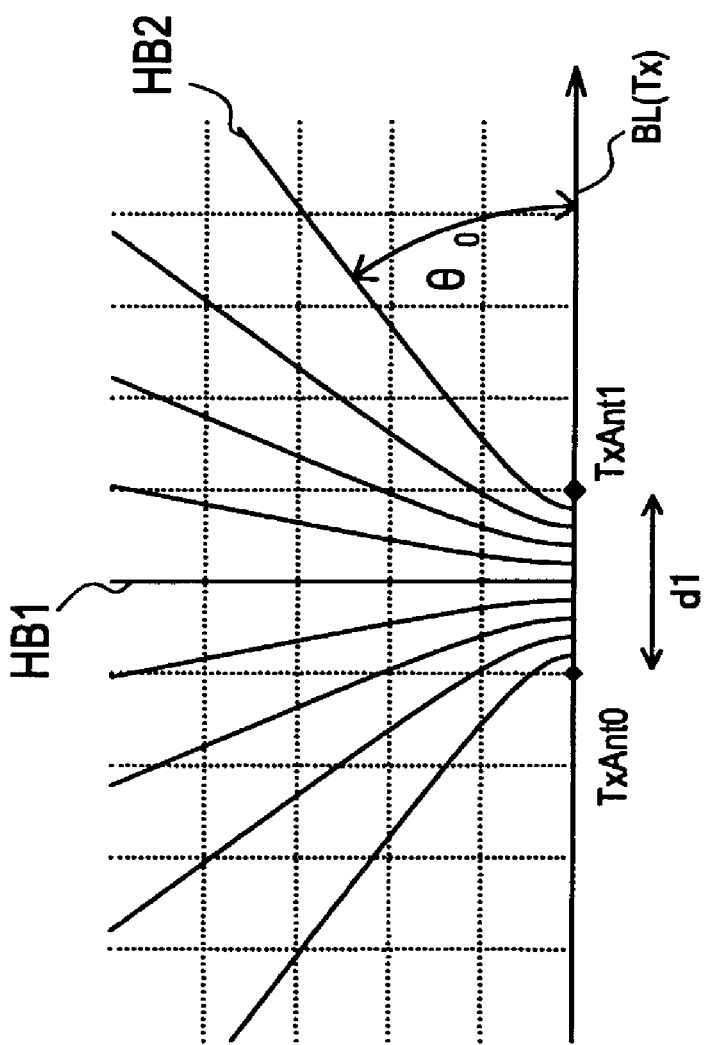
FIG. 7 is an explanatory view to describe a hyperbolic locus relevant to a receiving antenna.

FIG. 7 is an explanatory view to describe a hyperbolic locus formed by a receiving antenna.

Referring to FIG. 7, nine hyperbolic loca with their focal points at two points which are separated by the spacing d1 are shown. The two focal points respectively correspond to the positions of the transmitting antennas TxAnt0 and TxAnt1. The straight line connecting the two focal points corresponds to the baseline BL(Tx) of the transmitting antennas. On such a plane of FIG. 7, if the path length difference $\Delta L_0$ is zero, for example, the hyperbolic locus formed by the receiving antenna RxAnt0 is a straight line HB1. If the path length difference $\Delta L_0$ is 80% of the transmitting antenna spacing d1, for example, the hyperbolic locus formed by the receiving antenna RxAnt0 is a hyperbola HB2. The angle calculation unit 252 first calculates such hyperbolic loca. On the assumption that a distance between the transmitting device 100 and the receiving device 200 is sufficiently longer than the transmitting antenna spacing d1, the calculated hyperbolic locus can be approximated to a straight line. Thus, if the calculated hyperbolic locus is the hyperbola HB2, for example, the angle calculation unit 252 sets an angle ($\theta_0$ in FIG. 7) between the straight line approximated by the hyperbola HB2 and the baseline BL(Tx) as a path angle $\theta_0$ of the receiving antenna RxAnt0.

The angle calculation unit 252 calculates a path angle $\theta_1$ of the receiving antenna RxAnt1 and a path angle $\theta_2$ of the receiving antenna RxAnt2 in the same manner. After that, the angle calculation unit 252 outputs the calculated path angles $\theta_1$ to $\theta_2$ of the respective receiving antennas to the range estimation unit 254.

[3.2. Estimation of Existing Range]

The range estimation unit 254 estimates an existing range where the transmitting device 100 possibly exists based on differences in the above-described path angles calculated by the angle calculation unit 252 among the receiving antennas.

Specifically, the range estimation unit 254 first determines a first circular locus according to a difference in path angle between a first pair of receiving antennas, for example. The range estimation unit 254 next determines a second circular locus according to a difference in path angle between a second pair of receiving antennas. Then, the range estimation unit 254 estimates an existing range of the transmitting device 100 based on coordinates of an intersection of the first circular locus and the second circular locus.

Figure 8:
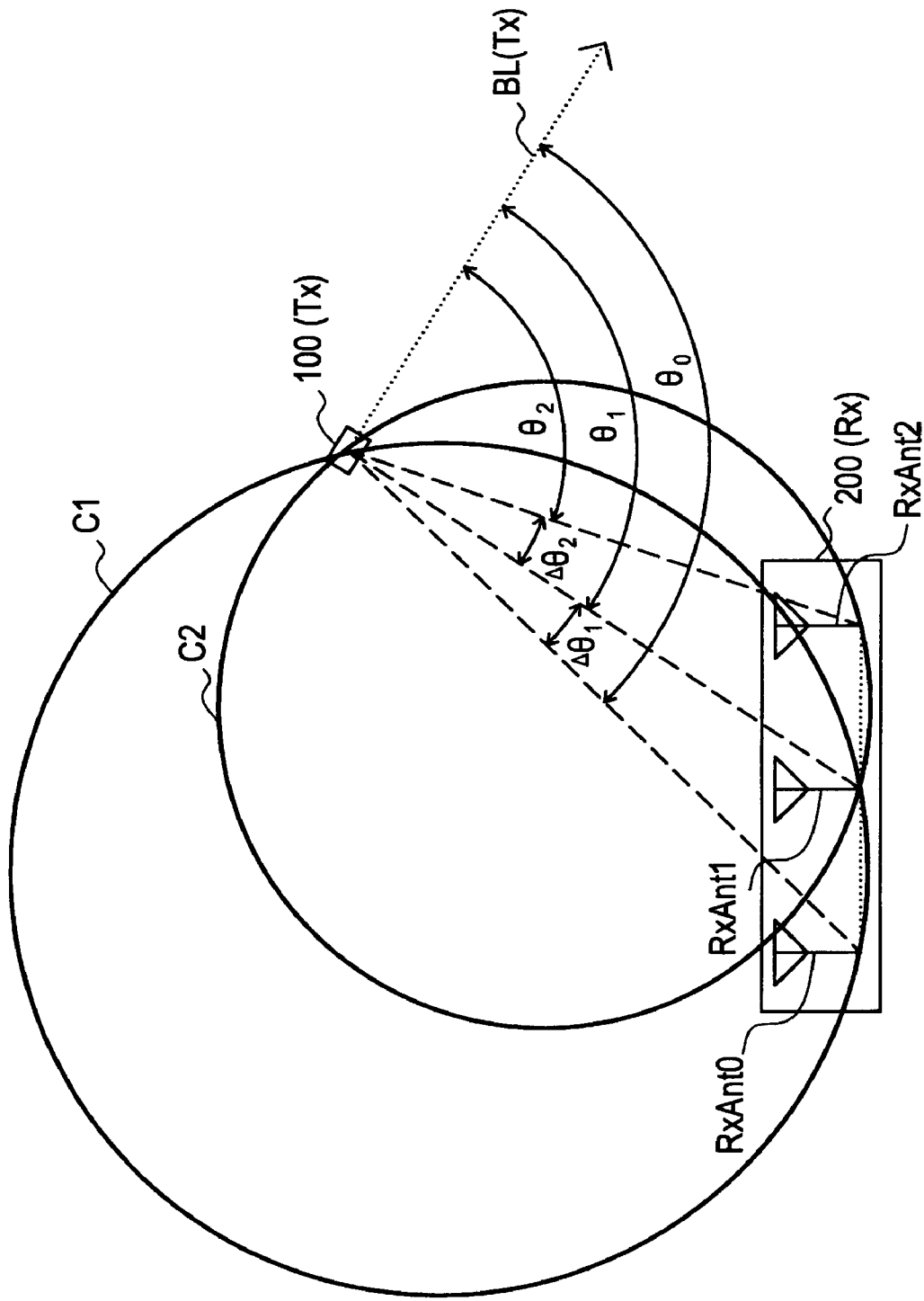
FIG. 8 is an explanatory view to describe range estimation processing by a range estimation unit.

FIG. 8 is an explanatory view to describe range estimation processing by the range estimation unit 254. In this example, the range estimation unit 254 selects the receiving antennas RxAnt0 and RxAnt1 as the first pair of receiving antennas and the receiving antennas RxAnt1 and RxAnt2 as the second pair of receiving antennas.

For the first pair of receiving antennas, the range estimation unit 254 calculates a difference $\Delta\theta_1$ between the path angles $\theta_0$ and $\theta_1$ calculated by the angle calculation unit 252. Then, based on the theorem of the constant circumferential angle, the difference $\Delta\theta_1$ in path angle is constant, and a first circular locus C1 where the receiving antennas RxAnt0 and RxAnt1 and the transmitting device 100 are located on its circumference can be specified.

Next, for the second pair of receiving antennas, the range estimation unit 254 calculates a difference $\Delta\theta_2$ between the path angles $\theta_1$ and $\theta_2$ calculated by the angle calculation unit 252. Then, based on the theorem of the constant angle of circumference, the difference $\Delta\theta_2$ in path angle is constant, and a second circular locus C2 where the receiving antennas RxAnt1 and RxAnt2 and the transmitting device 100 are located on its circumference can be specified.

Then, the range estimation unit 254 calculates intersections between the first circular locus C1 and the second circular locus C2. As is understood from FIG. 8, there are two intersections between the first circular locus C1 and the second circular locus C2, and one of them is located on the receiving device 200. Therefore, the range estimation unit 254 estimates that the transmitting device 100 exists in the vicinity of the intersection which is not located on the receiving device 200, out of the two intersections of the first circular locus C1 and the second circular locus C2.

Although the receiving antennas RxAnt0 and RxAnt1 are selected as the first pair of receiving antennas and the receiving antennas RxAnt1 and RxAnt2 are selected as the second pair of receiving antennas in this example, the way of selecting a pair of receiving antennas is not limited to such an example. Further, a third circular locus may be determined from a third pair of receiving antennas, so that the accuracy of range estimation is enhanced with use of the third circular locus.

Figure 9:
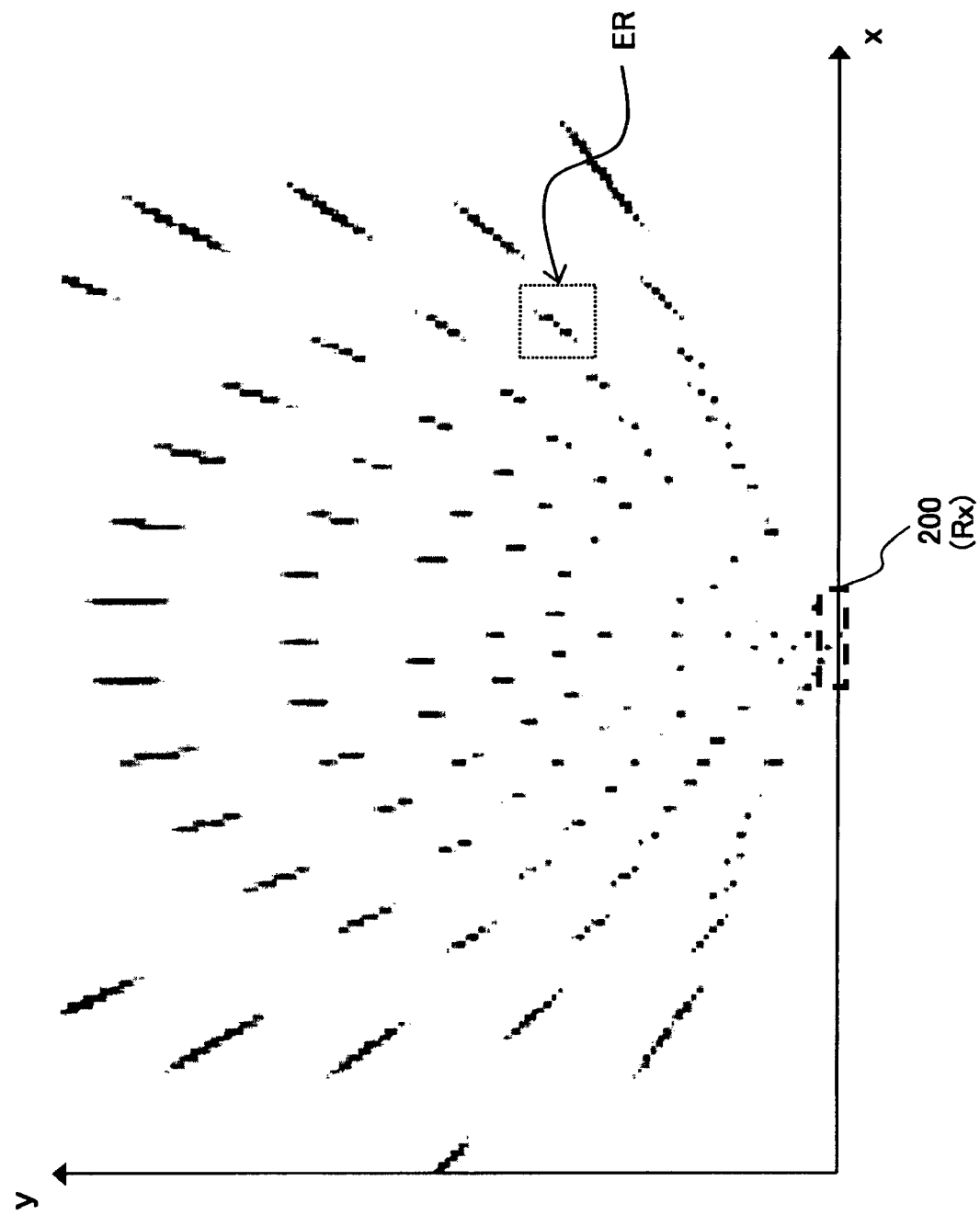
FIG. 9 is an explanatory view showing an example of an existing range of a transmitting device estimated by a range estimation unit.

FIG. 9 is an explanatory view showing an example of an existing range of the transmitting device 100 estimated by the range estimation unit 254.

Referring to FIG. 9, a rectangular existing range ER where there is a possibility that the transmitting device 100 exists is shown on the x-y plane in the vicinity of the receiving device 200 shown in FIG. 2. As shown therein, the existing range ER may be a rectangular range with the center at the coordinates of the intersection of the first circular locus C1 and the second circular locus C2 shown in FIG. 8 and having specific width and height in the x-direction and the y-direction. Alternatively, the existing range ER may be a circular range having a specific radius or the like, for example. A parameter such as the width and height or the radius of the existing range ER is previously determined according to the appearance density of virtual images which is predicted based on the wavelength $\lambda$ of a radio signal. For example, the width and height of the existing range ER may be set to be about ±10 times the wavelength $\lambda$ of a radio signal.

The range estimation unit 254 outputs information indicating the existing range of the transmitting device 100 (coordinates of one vertex of a rectangle and a width and a height, coordinates of a center point and a radius or the like) that is estimated as above to the position determination unit 260.

[4. Position Determination Processing (Second Stage)]

The position determination unit 260 evaluates the possibility that the transmitting device 100 exists with respect to each position within the existing range of the transmitting device 100 that is estimated by the estimation unit 250. For example, the position determination unit 260 can evaluate the possibility that the transmitting device 100 exists with use of a steering vector corresponding to the coordinates of each position by means of eigenvalue analysis.

Hereinafter, the case of evaluating the possibility that the transmitting device 100 exists in each position according to the MUSIC method, which is one of the eigenvalue analysis, is described.

First, known coordinate values of three receiving antennas are given to the position determination unit 260. In this example, a coordinate value of the receiving antenna RxAnt0 is $(x_{Rx0}, y_{Rx0})$, a coordinate value of the receiving antenna RxAnt1 is $(x_{Rx1}, y_{Rx1})$, and a coordinate value of the receiving antenna RxAnt2 is $(x_{Rx2}, y_{Rx2})$. Further, an unknown coordinate value of the transmitting device 100 is $(x_{Tx}, y_{Tx})$. Using such coordinate values, the path lengths $L_0$ to $L_2$ between the respective receiving antennas RxAnt0 to RxAnt2 and the transmitting device 100 can be defined as follows:

$$L_0 = \sqrt{(x_{Rx0}-x_{Tx})^2 + (y_{Rx0}-y_{Tx})^2} \quad \text{Expression 2}$$

$$L_1 = \sqrt{(x_{Rx1}-x_{Tx})^2 + (y_{Rx1}-y_{Tx})^2} \quad \text{Expression 3}$$

$$L_2 = \sqrt{(x_{Rx2}-x_{Tx})^2 + (y_{Rx2}-y_{Tx})^2} \quad \text{Expression 4}$$

Further, differences in path length between the respective receiving antennas RxAnt0 to RxAnt2 and the transmitting device 100 on the basis of the receiving antenna RxAnt0 are defined as follows:

$$D_0 = L_0 - L_0 (=0) \quad \text{Expression 5}$$

$$D_1 = L_0 - L_1 \quad \text{Expression 6}$$

$$D_2 = L_0 - L_2 \quad \text{Expression 7}$$

Using the above path length differences $D_0$ to $D_2$, the position determination unit 260 forms the steering vector v for calculation of a MUSIC spectrum as shown in the following expression:

$$v = \begin{bmatrix} \exp\left(-i \cdot 2\pi \cdot \frac{D_0}{\lambda}\right) \\ \exp\left(-i \cdot 2\pi \cdot \frac{D_1}{\lambda}\right) \\ \exp\left(-i \cdot 2\pi \cdot \frac{D_2}{\lambda}\right) \end{bmatrix} \quad \text{Expression 8}$$

Further, the position determination unit 260 creates an inter-antenna covariance matrix R which is represented by the following expression by using the channel responses $h_{00}$, $h_{01}$ and $h_{02}$ relative to the transmitting antenna TxAnt0 out of the channel responses input from the demodulation unit 220.

$$R = \begin{bmatrix} h_{00}h_{00}^* & h_{00}h_{01}^* & h_{00}h_{02}^* \\ h_{01}h_{00}^* & h_{01}h_{01}^* & h_{01}h_{02}^* \\ h_{02}h_{00}^* & h_{02}h_{01}^* & h_{02}h_{02}^* \end{bmatrix} \quad \text{Expression 9}$$

At this point, general spatial averaging may be performed on the inter-antenna covariance matrix R. The spatial averaging is processing to be performed for separating direct waves from reflected waves when a signal with strong correlation is added to an input signal due to reflection of a radio signal or the like. By reducing the degree of correlation between direct waves and reflected waves by spatial averaging, the rank of a correlation matrix is restored, which generally improves the measurement accuracy by the MUSIC method.

For example, the number of direct waves and reflected waves input to the receiving device 200 is $N_L$. The value of $N_L$ is 1 when only direct waves are input. The value of $N_L$ can be estimated in accordance with the real world by using a technique such as Akaike Information Criteria (AIC), for example. Because it is normally necessary that $N_L$ is smaller than the number of receiving antennas, the value of $N_L$ is 2 at maximum in this embodiment.

Next, the position determination unit 260 calculates eigenvalues and eigenvectors of the inter-antenna covariance matrix R by solving an eigenequation of the inter-antenna covariance matrix R, for example. The eigenvectors calculated at this point are represented as $e_1$, $e_2$ and $e_3$ in ascending order of corresponding eigenvalues.

Then, the position determination unit 260 calculates a MUSIC spectrum $P(x_{Tx}, y_{Tx})$ as represented by the following expression by using the steering vector $v(x_{Tx}, y_{Tx})$ with the parameter of the coordinate value $(x_{Tx}, y_{Tx})$ of the transmitting device 100 and the eigenvectors $e_1$, $e_2$ and $e_3$.

$$P(x_{Tx}, y_{Tx}) = \frac{1}{\sum_{i=1}^{3-L} |e_i \cdot v(x_{Tx}, y_{Tx})|} \quad \text{Expression 10}$$

Figure 10:
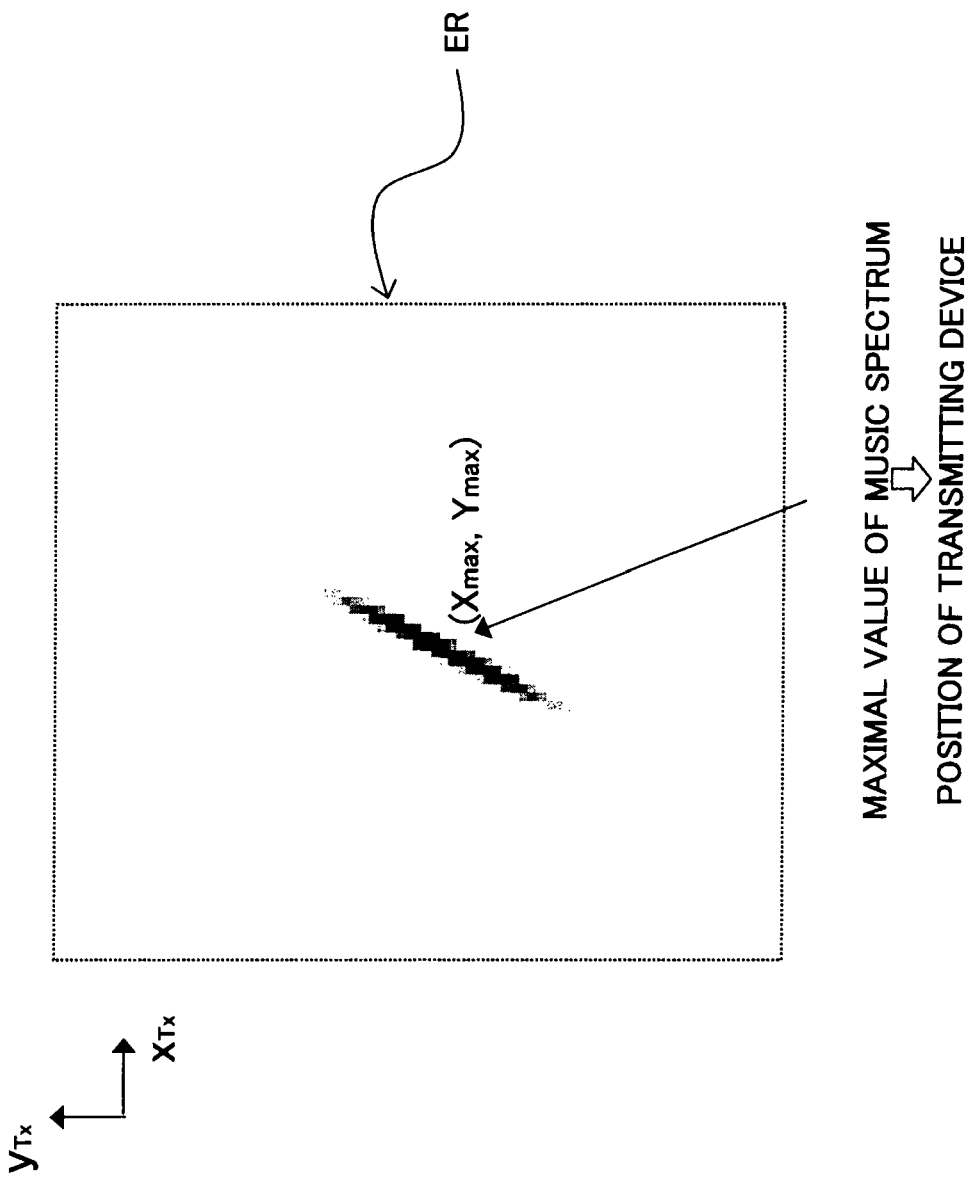
FIG. 10 is an explanatory view showing an example of a MUSIC spectrum calculated according to the MUSIC method within an existing range estimated by a range estimation unit.

FIG. 10 is an explanatory view showing an example of a MUSIC spectrum calculated by the position determination unit 260 according to the above-described MUSIC method with respect to each coordinates within the existing range ER of the transmitting device 100 estimated by the range estimation unit 254.

Referring to FIG. 10, the magnitude of the value of the MUSIC spectrum $P(x_{Tx}, y_{Tx})$ calculated by the position determination unit 260 is indicated by the contrast at each position within the existing range ER. In this example, the MUSIC spectrum $P(x_{Tx}, y_{Tx})$ has a maximal value at the position of a coordinate value $(X_{max}, Y_{max})$. Accordingly, the position determination unit 260 determines the position of the coordinate value ($X_{max}$, $Y_{max}$) as an existing position of the transmitting device 100. The position determination unit 260 outputs the existing position of the transmitting device 100 that is determined in this manner to the CPU 240, for example.

A method of determining an existing position of the transmitting device 100 in the second stage is not limited to such an example. For example, the position determination unit 260 may determine a position of the transmitting device 100 by using a known technique such as hyperbolic localization instead of the MUSIC method.

The range estimation processing by the estimation unit 250 and the position determination processing by the position determination unit 260 in the receiving device 200 are described above with reference to FIGS. 5 to 10. Hereinafter, a flow of position detection processing by the receiving device 200 according to the embodiment is described with reference to FIG. 11.

<5. Flow of Processing>

Figure 11:
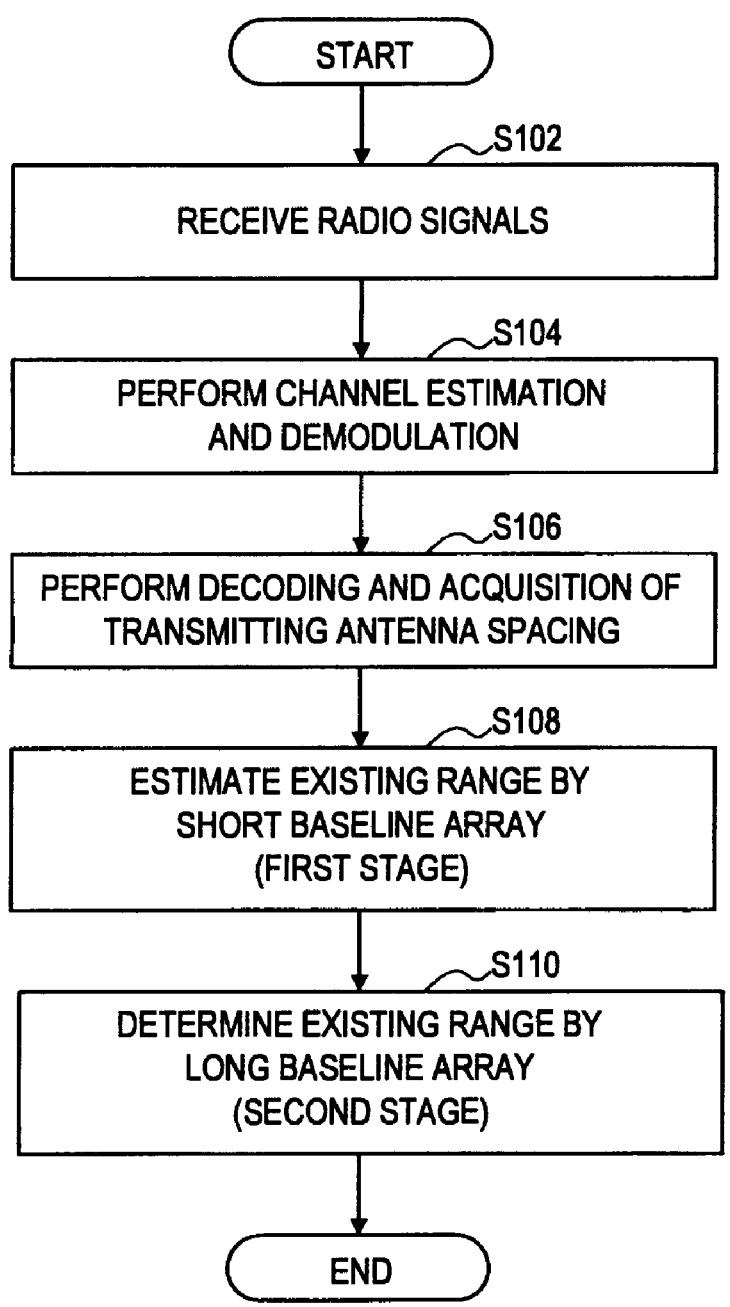
FIG. 11 is a flowchart showing a flow of position detection processing according to an embodiment.

FIG. 11 is a flowchart showing a flow of position detection processing by the receiving device 200 according to the embodiment.

Referring to FIG. 11, first, in the receiving device 200, radio signals transmitted from the transmitting antennas TxAnt0 and TxAnt1 of the transmitting device 100 are received through the receiving antennas RxAnt0 to RxAnt2 (S102). The received signals are output to the demodulation unit 220.

Next, the demodulation unit 220 estimates the channel responses $h_{00}$ to $h_{12}$ of the respective communication channels based on the received signals and demodulates the signals (S104). The demodulated signals are output to the decoding unit 230. The channel responses $h_{00}$ to $h_{12}$ are output to the estimation unit 250 and the position determination unit 260.

Then, the decoding unit 230 decodes the demodulated signals and acquires the transmitting antenna spacing d1 transmitted from the transmitting device 100 (S106). The acquired transmitting antenna spacing d1 is output to the estimation unit 250.

Then, the estimation unit 250 performs existing range estimation processing by a short baseline array as processing of the first stage for position detection (S108). The short baseline array indicates an antenna array of the transmitting device 100 configured in such a way that the transmitting antenna spacing d1 is equal to or smaller than a half-wavelength of a radio signal. Specifically, the estimation unit 250 first calculates phase differences of the respective transmitting antennas with respect to each receiving antenna from the channel responses $h_{00}$ to $h_{12}$. The estimation unit 250 next calculates path differences among radio signals corresponding to the phase differences of the respective transmitting antennas with respect to each receiving antenna and estimates an existing range of the transmitting device 100 based on the path differences and the transmitting antenna spacing. Data related to the estimated existing range of the transmitting device 100 is output to the position determination unit 260.

The position determination unit 260 then performs existing position determination processing by a long baseline array as processing of the second stage for position detection (S110). The long baseline array indicates an antenna array of the receiving device 200 configured in such a way that the receiving antenna spacing d2 is larger than a half-wavelength of a radio signal. Specifically, the position determination unit 260 calculates a MUSIC spectrum representing the possibility that the transmitting device 100 exists with respect to each position within the existing range of the transmitting device 100 which is estimated by the estimation unit 250 in the step S108. The position determination unit 260 then determines a position at which the MUSIC spectrum is maximal in the above-described existing range as an existing position of the transmitting device 100. The determined existing position of the transmitting device 100 is output to the CPU 240, for example. The position detection processing by the receiving device 200 thereby ends.

<6. Summary>

The communication system 10 according to an embodiment of the present invention is described above with reference to FIGS. 1 to 11.

As described above with reference to FIG. 2, if the transmitting antenna spacing is equal to or larger than a half-wavelength in a device that detects a position of a device at the other end of communication, virtual images due to the effect of a grating lobe are generally generated, causing a failure to uniquely determine a position of a device at the other end of communication. On the other hand, according to the embodiment described above, the range of the position of the transmitting device 100 is narrowed down by using the positional relationship of the short baseline array of the transmitting device 100 in the first stage, and, after that, the position of the transmitting device 100 is determined by using the long baseline array of the receiving device 200 in the second stage. It is thereby possible to uniquely identify the position of the transmitting device 100 at high accuracy by enlarging the receiving antenna spacing without mounting a large number of antennas to the receiving device 200.

Further, according to the embodiment, the transmitting device 100 can have a physical configuration equal to that of general MIMO communication equipment as shown in FIG. 3. Therefore, it is possible to flexibly measure a position of general MIMO communication equipment by using the receiving device 200 that implements the position detection method according to the embodiment.

Furthermore, according to the embodiment, the position determination processing with use of eigenvalue analysis or the like that generally imposes high processing costs can be executed over a limited target range in the second stage. It is thereby possible to reduce processing costs for position detection.

In the above embodiment, the case of notifying transmitting antenna spacing from the transmitting device 100 to the receiving device 200 is described. However, if transmitting antenna spacing of the transmitting device 100 is known to the receiving device 200, processing of notifying transmitting antenna spacing may be omitted.

Further, a part of the processing of the receiving device 200 described in the embodiment may be executed by the transmitting device 100. For example, in the case where the transmitting device 100 performs the path angle calculation processing which is performed by the angle calculation unit 252 in the above-described embodiment, a path angle calculation result can be notified from the transmitting device 100 to the receiving device 200 instead of that transmitting antenna spacing is notified from the transmitting device 100 to the receiving device 200.

Furthermore, a series of position detection processing described above may be implemented by hardware or software. In the case of executing a series of or a part of processing by software, a program constituting the software is pre-stored in ROM, loaded to RAM upon execution and then executed by a CPU.

Although preferred embodiments of the present invention are described in detail above with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-002783 filed in the Japan Patent Office on Jan. 8, 2009, the entire content of which is hereby incorporated by reference.

What is claimed is:

1. A communication device, comprising:
a receiving unit that receives radio signals transmitted from another communication device using a plurality of transmitting antennas by at least three receiving antennas;
an estimation unit that estimates a range of a position where said another communication device possibly exists based on a phase of each radio signal received by the receiving unit and antenna spacing between the transmitting antennas; and
a position determination unit that determines an existing position of said another communication device within the range estimated by the estimation unit, wherein:
the estimation unit further estimates the range of the position where said another communication device possibly exists based on coordinates of an intersection of a first circular locus specified according to a difference in the path angle between a first pair of the receiving antennas and a second circular locus specified according to a difference in the path angle between a second pair of the receiving antennas.

2. The communication device according to claim 1, wherein antenna spacing between the receiving antennas in the receiving unit is larger than a half of a wavelength of a radio signal.

3. The communication device according to claim 1, wherein the position determination unit determines the existing position according to eigenvalue analysis by using a steering vector corresponding to coordinates of each position within the range estimated by the estimation unit.

4. The communication device according to claim 1, wherein the estimation unit includes:
an angle calculation unit that calculates, for each receiving antenna, a path angle between a baseline of the transmitting antennas and a communication path to the receiving antenna based on phase differences among radio signals received from the transmitting antennas by the receiving antenna; and
a range estimation unit that estimates a range of a position where said another communication device possibly exists based on differences in the path angle calculated by the angle calculation unit among the receiving antennas.

5. The communication device according to claim 1, wherein the estimation unit acquires the antenna spacing between the transmitting antennas from said another communication device through the receiving unit.

6. A communication system comprising:
a transmitting device including a transmitting unit that transmits radio signals from a plurality of transmitting antennas; and
a receiving device including:
a receiving unit that receives radio signals transmitted from the transmitting device by at least three receiving antennas,
an estimation unit that estimates a range of a position where the transmitting device possibly exists based on a phase of each radio signal received by the receiving unit and antenna spacing between the transmitting antennas, and
a position determination unit that determines an existing position of the transmitting device within the range estimated by the estimation unit,
wherein the estimation unit further estimates the range of the position where said another communication device possibly exists based on coordinates of an intersection of a first circular locus specified according to a difference in the path angle between a first pair of the receiving antennas and a second circular locus specified according to a difference in the path angle between a second pair of the receiving antennas.

7. The communication system according to claim 6, wherein:
the antenna spacing between the transmitting antennas in the transmitting unit is equal to or smaller than a half of a wavelength of a radio signal, and
antenna spacing between the receiving antennas in the receiving unit is larger than a half of a wavelength of a radio signal.

8. A position detection method comprising the steps of:
receiving radio signals transmitted from another communication device using a plurality of transmitting antennas by at least three receiving antennas;
estimating a range of a position where said another communication device possibly exists based on a phase of each received radio signal and antenna spacing between the transmitting antennas; and
determining an existing position of said another communication device within the estimated range,
wherein the estimating comprises estimating the range of the position where said another communication device possibly exists based on coordinates of an intersection of a first circular locus specified according to a difference in the path angle between a first pair of the receiving antennas and a second circular locus specified according to a difference in the path angle between a second pair of the receiving antennas.

9. A program stored in a non-transitory computer readable medium, the program causing a computer controlling a communication device including a receiving unit that receives radio signals transmitted from another communication device using a plurality of transmitting antennas by at least three receiving antennas to implement functions comprising:
an estimation unit that estimates a range of a position where said another communication device possibly exists based on a phase of each radio signal received by the receiving unit and antenna spacing between the transmitting antennas; and
a position determination unit that determines an existing position of said another communication device within the range estimated by the estimation unit,
wherein the estimation unit further estimates the range of the position where said another communication device possibly exists based on coordinates of an intersection of a first circular locus specified according to a difference in the path angle between a first pair of the receiving antennas and a second circular locus specified according to a difference in the path angle between a second pair of the receiving antennas.

* * * * *